C. L. RICE.
SPRING-BRACES FOR VEHICLES.

No. 171,864. Patented Jan. 4, 1876.

Witnesses.
Julius G. Bone
E. W. Sharp

Inventor.
Chas. L. Rice

UNITED STATES PATENT OFFICE.

CHARLES L. RICE, OF DUNMORE, PENNSYLVANIA.

IMPROVEMENT IN SPRING-BRACES FOR VEHICLES.

Specification forming part of Letters Patent No. 171,864, dated January 4, 1876; application filed August 16, 1875.

*To all whom it may concern:*

Be it known that I, CHARLES L. RICE, of Dunmore, in the county of Luzerne and State of Pennsylvania, have invented a new and useful Improvement to be applied to Spring-Vehicles for the purposes hereinafter mentioned, viz:

First, aiding the ordinary springs by a constant upward elastic bearing; second, preventing the body from surging either backward or forward, especially overcoming the tendency to pitch forward when the horse stops suddenly, or when the vehicle is jolted by a ditch or any other impediment; third, strengthening the reach, taking off the upward strain when the wheels are suddenly impeded; fourth, tightening when the body of the vehicle comes down and loosening when it rises again to its natural position; fifth, holding the elliptic springs always at right angles to the reach, allowing their free movement upward and downward, and taking off the great friction of the hinges and strain on the bolts, clasps, king-bolt, spring-bars, and head-block, occasioned by leaning forward or backward.

Figure 1:
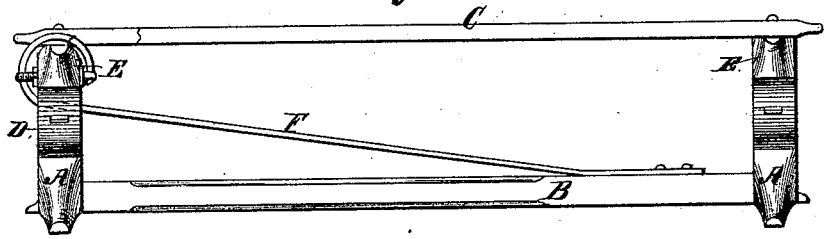
Figure 2:
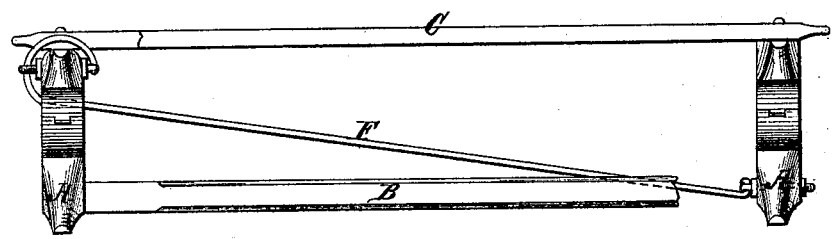
Figure 3:
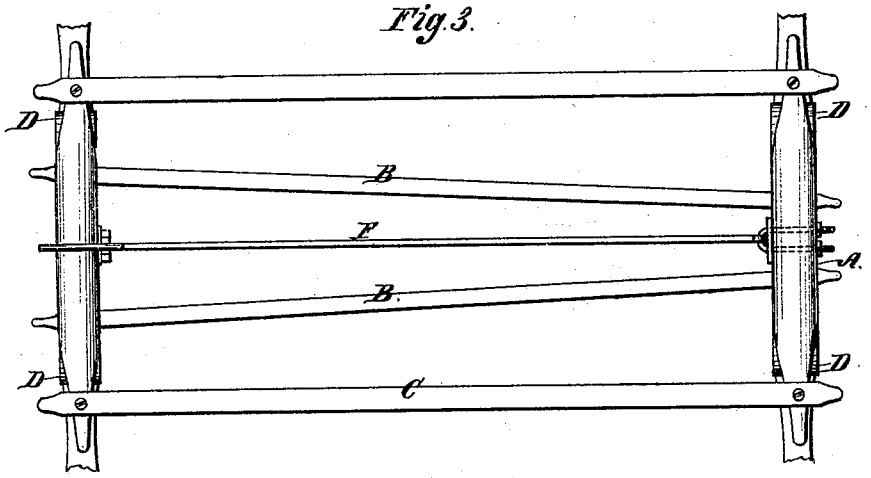

In the accompanying drawings, Figure 1 is a side view of my invention with the brace F attached to the single reach B. Fig. 2 is a side view with the brace attached to the head-block A of a double-reach vehicle. Fig. 3 is a plan view of the brace attached to the head-block A of a double-reach vehicle.

Similar letters of reference indicate like parts.

A A represent the head-block and base on which the elliptic springs rest; B, the reach or perch which connects them. C is the frame of the carriage-body, which rests at the front and rear ends upon the spring-bars E E over the springs D, which may be of usual construction. F is a spring-brace, whose lower end is attached in any appropriate manner to the reach B or to the head-block A, and whose upper or other end is coiled or bent into the form of a whole or partial circle, which passes around the spring-bar E and around the upper segment of the elliptic spring, and is secured to such bar or to the spring under this bar.

If desired, the coiled or circular part of the spring may be placed at the front of the carriage instead of at its rear by attaching it to the head-block or to the lower segment of the front spring or to the reach.

The upper end may be attached to the body of the vehicle in front of the hind spring, if deemed desirable.

This brace, by reason of its coil or circle at one end, is at liberty to tighten when the body of the vehicle descends, and of loosening when it rises again to its normal position, and thus eases the motions and greatly relieves the friction of the hinges, and reduces and takes upon itself a great part of the strain which would otherwise come upon the bolts, clasps, king-bolt, spring-bars, and head-block.

This brace may be made of steel or any other elastic substance, by which the backward pressure shall be increased or lessened according to the strain or loading to which the vehicle may be subjected.

What I claim as new, and desire to secure by Letters Patent, is—

The spring F, constructed with a whole or partial circle at one end, and applied to the spring-bar or spring and to the reach, as and for the purpose described.

In testimony whereof I have hereunto set my hand this 2d day of August, 1875.

CHAS. L. RICE.

Witnesses:
 JOHN D. FULLER,
 CHAS. FULLER.